March 11, 1941.  H. A. KNOX  2,234,179
TRANSMISSION
Filed Oct. 8, 1940  2 Sheets-Sheet 1

INVENTOR
Harry A. Knox
BY G. J. Kessenich & J. H. Church
ATTORNEYS

March 11, 1941.  H. A. KNOX  2,234,179
TRANSMISSION
Filed Oct. 8, 1940   2 Sheets-Sheet 2
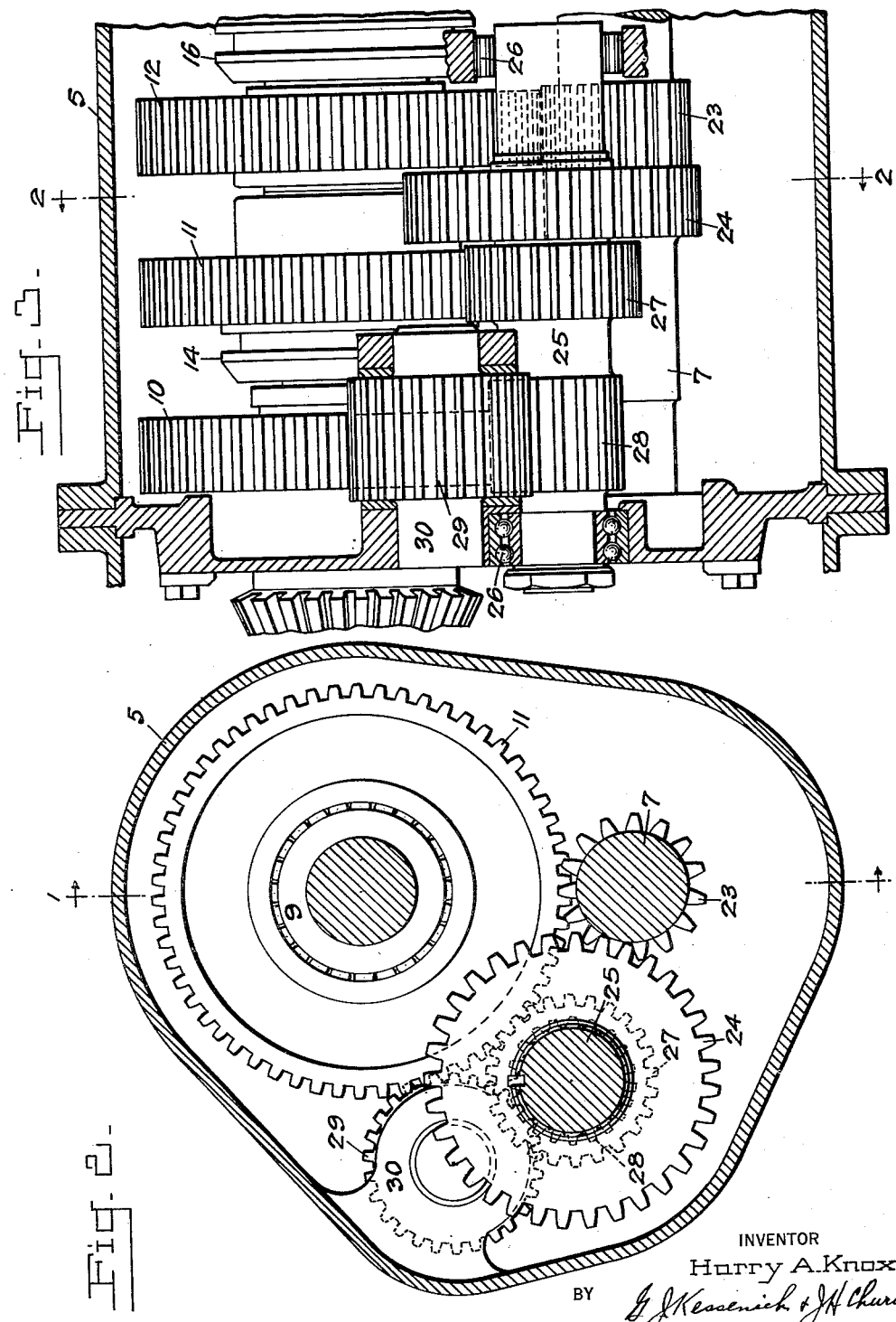
INVENTOR
Harry A. Knox
BY
ATTORNEYS Patented Mar. 11, 1941

2,234,179

UNITED STATES PATENT OFFICE 2,234,179

TRANSMISSION

Harry A. Knox, Washington, D. C.

Application October 8, 1940, Serial No. 360,297

2 Claims. (Cl. 74—359)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a transmission intended for heavy vehicles and is an improvement over the transmission shown in my U. S. Patent 2,043,251.

The purpose of the invention is to provide a rugged and compact change-speed transmission mechanism in which all gears are in constant mesh.

The specific nature of the invention as well as other objects and advantages thereof will clearly appear from a description of a preferred embodiment as shown in the accompanying drawings in which:

Fig. 2 is a sectional view taken on the line 2—2 of Fig. 3;

Fig. 3 is a view of the gearing in side elevation.

Figure 1:
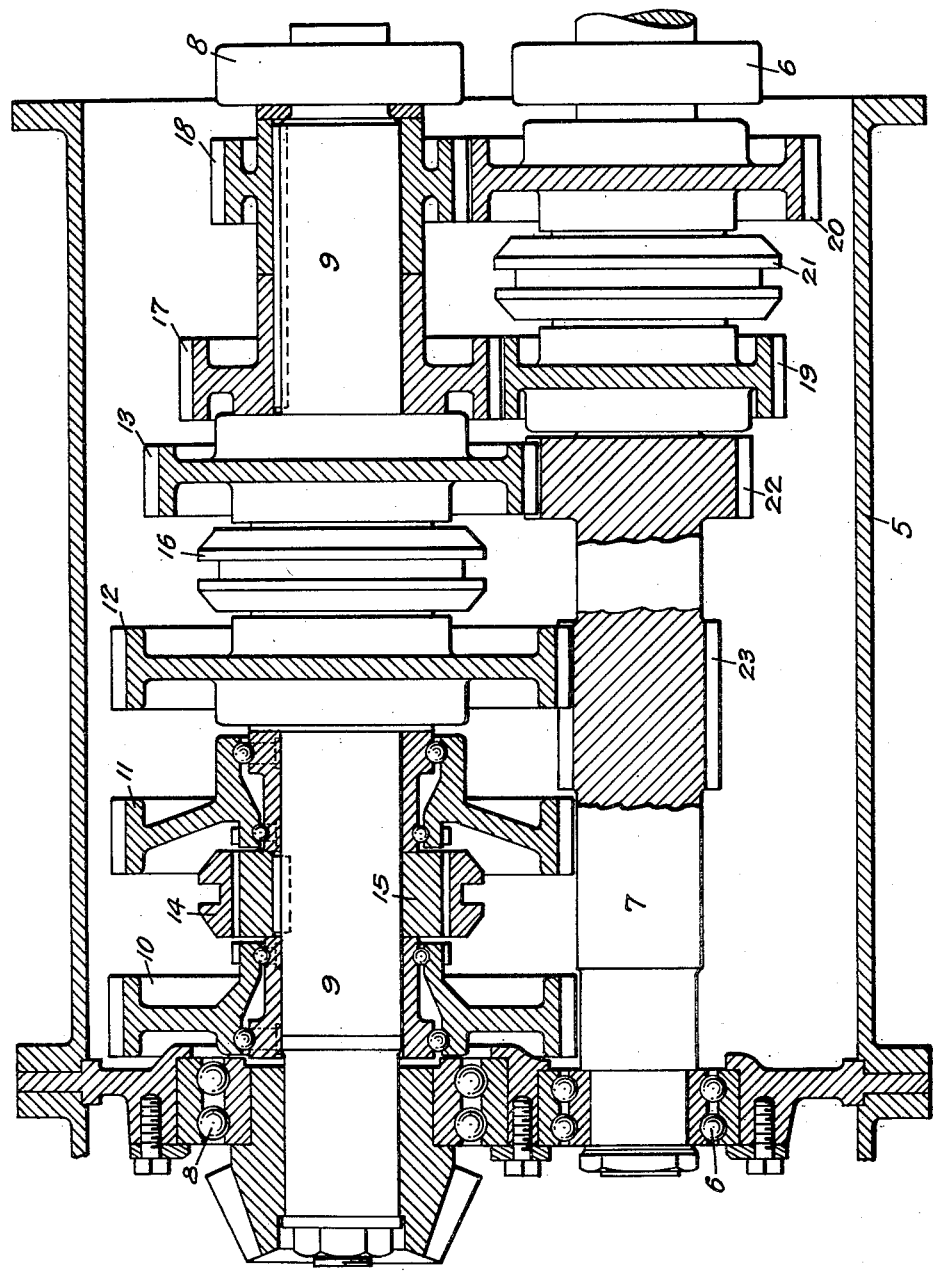
Fig. 1 is a sectional view taken on the line 1—1 of Fig. 2.

Referring to the drawings by characters of reference, there is shown in Fig. 1 a casing 5 having bearings 6—6 for mounting a drive shaft 7 and bearings 8—8 for mounting a driven shaft 9 parallel with the shaft 7.

The driven shaft 9 carries a plurality of rotatably mounted gears comprising a gear 10 for first speed, a gear 11 for reverse, a gear 12 for second speed, and a gear 13 for third speed. A clutch 14 slidably keyed on a collar 15 fixed on the shaft is adapted to selectively engage gears 10 and 11 and a similar clutch 16 is adapted to selectively engage gears 12 and 13. A pair of gears 17 and 18 respectively for fourth and fifth speeds are keyed on the driven shaft between the gear 13 and adjacent bearing 8.

A pair of gears 19 and 20 rotatably mounted on the drive shaft 7 are in constant mesh respectively with the gears 17 and 18. A clutch 21 similar to clutch 14 is adapted to selectively engage gears 19 and 20. A fixed gear 22 fixed on the drive shaft 7 is in constant mesh with gear 13 and a gear 23 fixed on the drive shaft is in constant mesh with gear 12.

Gear 23 (Figs. 2 and 3) also serves to drive gear 24 which is keyed on an idler shaft 25 mounted in bearings 26—26. A gear 27 fixed on the idler shaft 25 is in constant mesh with reverse gear 11. A gear 28 also fixed on the idler shaft 25 is in constant mesh with an idler gear 29 which is rotatably mounted on a stub shaft 30. The gear 29 is in constant mesh with gear 10.

By reference to Fig. 1 it is apparent that clutch 21 on the drive shaft controls the power transmission through fourth and fifth speeds, clutch 16 serves in like manner for second and third speeds, and clutch 14 controls first speed and reverse.

I claim:

1. A transmission embodying a drive shaft, a driven shaft, change-speed gearing connecting the shafts, a forward gear and a reverse gear rotatable on the driven shaft, a clutch for selectively engaging the forward and reverse gears, an idler shaft constantly driven by the drive shaft, a fixed gear on the idler shaft in constant mesh with the reverse gear, and an idler gear driven by the idler shaft and in constant mesh with the forward gear.

2. A transmission embodying a drive shaft, a driven shaft, two sets of constant mesh change-speed gearing connecting the shafts, a clutch on the drive shaft for one set of gearing, a clutch on the driven shaft for the other set of gearing, a forward gear and a reverse gear rotatable on the driven shaft, a clutch for selectively coupling the forward and reverse gears to the driven shaft, an idler shaft constantly driven by the drive shaft, a fixed gear on the idler shaft in constant mesh with the reverse gear, and an idler gear driven by the idler shaft and in constant mesh with the forward gear.

HARRY A. KNOX.